(12) United States Patent
Oakley

(10) Patent No.: US 8,025,416 B2
(45) Date of Patent: Sep. 27, 2011

(54) INTEGRATED OPTICAL POLARIZATION COMBINING PRISM FOR PROJECTION DISPLAYS

(75) Inventor: William S. Oakley, San Jose, CA (US)

(73) Assignee: 3D4K Displays, Inc.

( * ) Notice: Subject to any disclaimer, the term of this patent is extended or adjusted under 35 U.S.C. 154(b) by 532 days.

(21) Appl. No.: 12/033,002

(22) Filed: Feb. 18, 2008

(65) Prior Publication Data

US 2009/0207379 A1 Aug. 20, 2009

(51) Int. Cl.
*G03B 21/28* (2006.01)
*G02B 27/14* (2006.01)

(52) U.S. Cl. .......................................... 353/81; 359/638
(58) Field of Classification Search .................. 353/20, 353/31, 33, 34, 119, 81; 349/5, 9, 8; 359/485.06, 359/489.09, 638, 640

See application file for complete search history.

(56) References Cited

U.S. PATENT DOCUMENTS

| | | | |
|---|---|---|---|
| 4,505,558 A | 3/1985 | Albers | |
| 4,790,633 A * | 12/1988 | Baker | 349/197 |
| 5,379,083 A | 1/1995 | Tomita | |
| 5,717,422 A | 2/1998 | Fergason | |
| 5,923,372 A | 7/1999 | Han | |
| 6,130,902 A * | 10/2000 | Shimoji | 372/34 |
| 6,153,927 A * | 11/2000 | Raj et al. | 257/680 |
| 6,220,730 B1 | 4/2001 | Hewlett | |
| 6,332,693 B1 | 12/2001 | Dove | |
| 6,445,500 B1 | 9/2002 | Itoh | |
| 6,499,849 B1 | 12/2002 | Huang | |
| 6,606,130 B1 | 8/2003 | George | |
| 6,715,901 B2 | 4/2004 | Huang | |
| 6,816,241 B2 | 11/2004 | Grubisic | |
| 6,923,546 B2 | 8/2005 | Kurematsu | |
| 6,950,098 B2 | 9/2005 | Brabander | |
| 6,972,810 B2 * | 12/2005 | Magarill et al. | 349/8 |
| 6,987,618 B2 | 1/2006 | Okamura | |
| 7,021,772 B2 | 4/2006 | Abe | |
| 7,104,655 B2 | 9/2006 | Abe | |

(Continued)

OTHER PUBLICATIONS

Office Action of U.S. Appl. No. 12/015,502, dated Mar. 3, 2010.

(Continued)

*Primary Examiner* — Georgia Epps
*Assistant Examiner* — Don Williams
(74) *Attorney, Agent, or Firm* — SVPC

(57) ABSTRACT

In an embodiment, an optical component is provided. The optical component includes a first polarizing prism having a first face, a second face and a third face. The light beam may be received incident on the first face. Light having a first polarization may be output through a second face and light having a second polarization may be output through a third face. The optical component further includes a half-wave plate fastened to the second face of the first polarizing prism. The optical component further includes a first reflecting prism connected to the third face of the first polarizing prism. The first reflecting prism has a first face and a second face, the first face connected to the third face of the first polarizing prism. The optical component further includes a second reflecting prism connected to the half-wave plate and to the second face of the first reflecting prism. The second reflecting prism has a first face, a second face and a third face. The first face of the second reflecting prism connected to the half-wave plate and the second face of the first reflecting prism. The optical component may be used in a projector, among other potential applications in some embodiments.

17 Claims, 11 Drawing Sheets

U.S. PATENT DOCUMENTS

| | | |
|---|---|---|
| 7,111,946 B2 | 9/2006 | Abe |
| 7,111,947 B2 | 9/2006 | Abe |
| 7,114,814 B2 | 10/2006 | Abe |
| 7,114,815 B2 | 10/2006 | Abe |
| 7,131,735 B2 | 11/2006 | Yokoyama |
| 7,163,298 B2 | 1/2007 | Abe |
| 7,220,006 B2 | 5/2007 | Allen |
| 7,237,929 B2 | 7/2007 | Stahl |
| 7,413,314 B2 | 8/2008 | Kim |
| 7,440,205 B2 | 10/2008 | Malfait |
| 7,572,035 B2 | 8/2009 | Hewlett |
| 7,575,330 B2 | 8/2009 | Allen |
| 7,585,093 B2 | 9/2009 | Hewlett |
| 7,604,348 B2 | 10/2009 | Jacobs |
| 7,692,861 B2 | 4/2010 | Robinson |
| 7,866,829 B2 | 1/2011 | Takeuchi |
| 2002/0036234 A1 | 3/2002 | Tang |
| 2003/0043582 A1 | 3/2003 | Chan |
| 2004/0140982 A1 | 7/2004 | Pate |
| 2004/0141159 A1 | 7/2004 | Abe |
| 2005/0052621 A1 | 3/2005 | Allen |
| 2005/0088663 A1 | 4/2005 | De Groot |
| 2006/0063985 A1 | 3/2006 | Hogan |
| 2006/0114425 A1 | 6/2006 | Abe |
| 2006/0119803 A1 | 6/2006 | Abe |
| 2006/0125969 A1 | 6/2006 | Chilla |
| 2006/0262282 A1 | 11/2006 | Magarill |
| 2006/0290890 A1 | 12/2006 | Saito |
| 2007/0052929 A1 | 3/2007 | Allman |
| 2007/0285627 A1 | 12/2007 | Allen |
| 2009/0179827 A1 | 7/2009 | Oakley |
| 2009/0180079 A1 | 7/2009 | Oakley |
| 2009/0251620 A1 | 10/2009 | Mortensen |
| 2009/0303397 A1 | 12/2009 | Allen |
| 2009/0322857 A1 | 12/2009 | Jacobs |

OTHER PUBLICATIONS

Office Action of U.S. Appl. No. 12/015,503, dated Oct. 14, 2010.
Office Action of U.S. Appl. No. 12/015,505, dated Dec. 8, 2010.
Office Action of U.S. Appl. No. 12/015,506, dated Jun. 10, 2010.
Office Action of U.S. Appl. No. 12/033,002, dated Aug. 18, 2010.
Office Action of U.S. Appl. No. 12/033,003, dated May 25, 2010.
Office Action of U.S. Appl. No. 12/015,502, dated Dec. 7, 2010.
Office Action of U.S. Appl. No. 12/015,503, dated Feb. 15, 2011.
International Preliminary Report of PCT App. PCT/US2009/031354, dated Aug. 18, 2009.
Written Opinion of the ISA of PCT App. PCT/US2009/031354, dated Aug. 18, 2009.
International Search Report of PCT App. PCT/US2009/031354, dated Aug. 18, 2009.
Office Action of U.S. Appl. No. 12/015,506, dated Apr. 28, 2011.

* cited by examiner

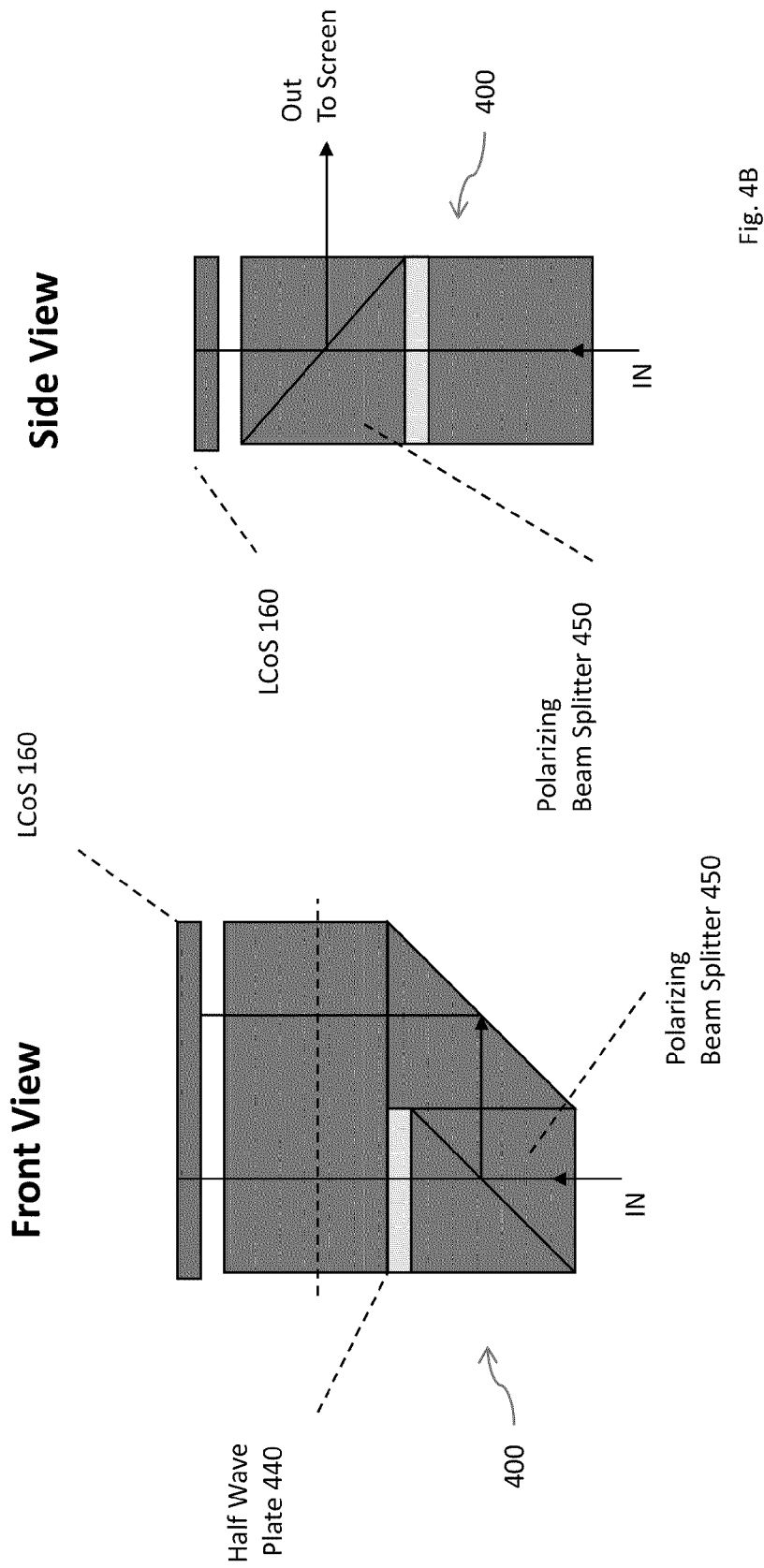

Side View of Box showing Air Flow

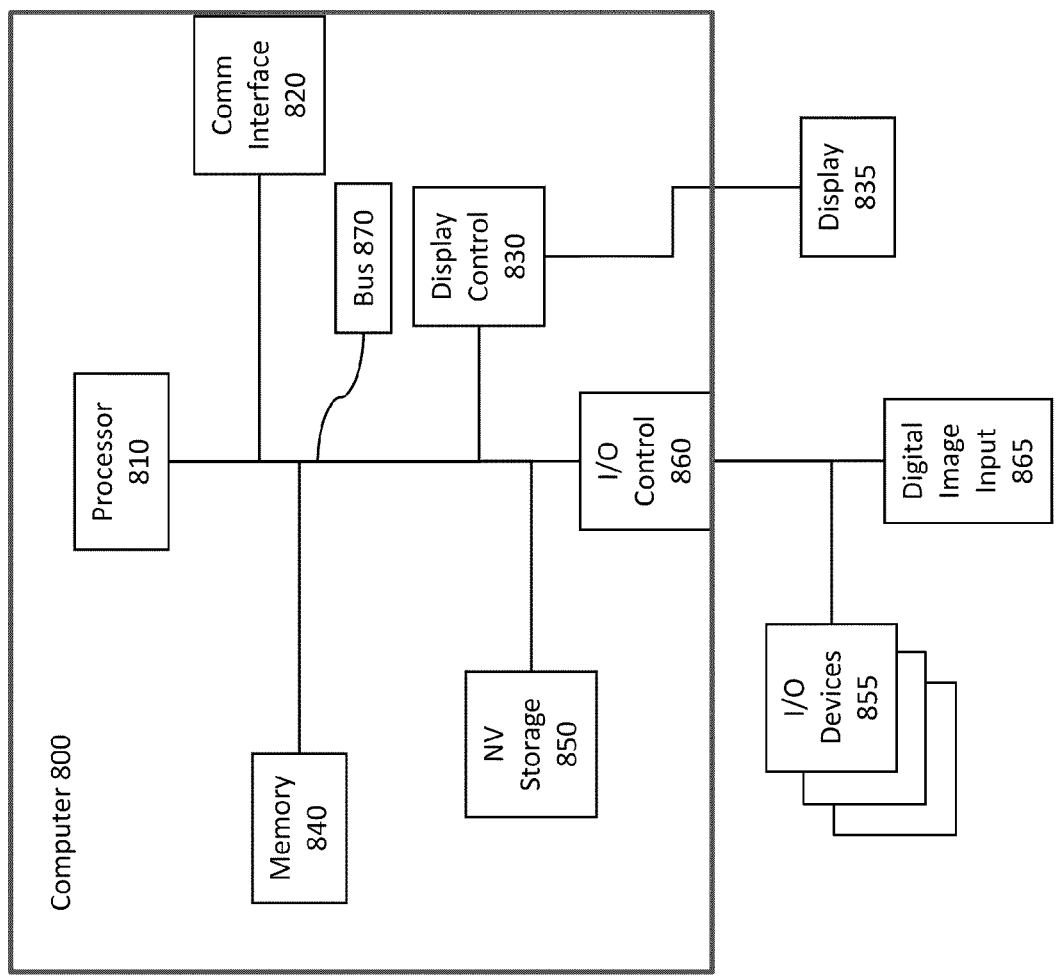

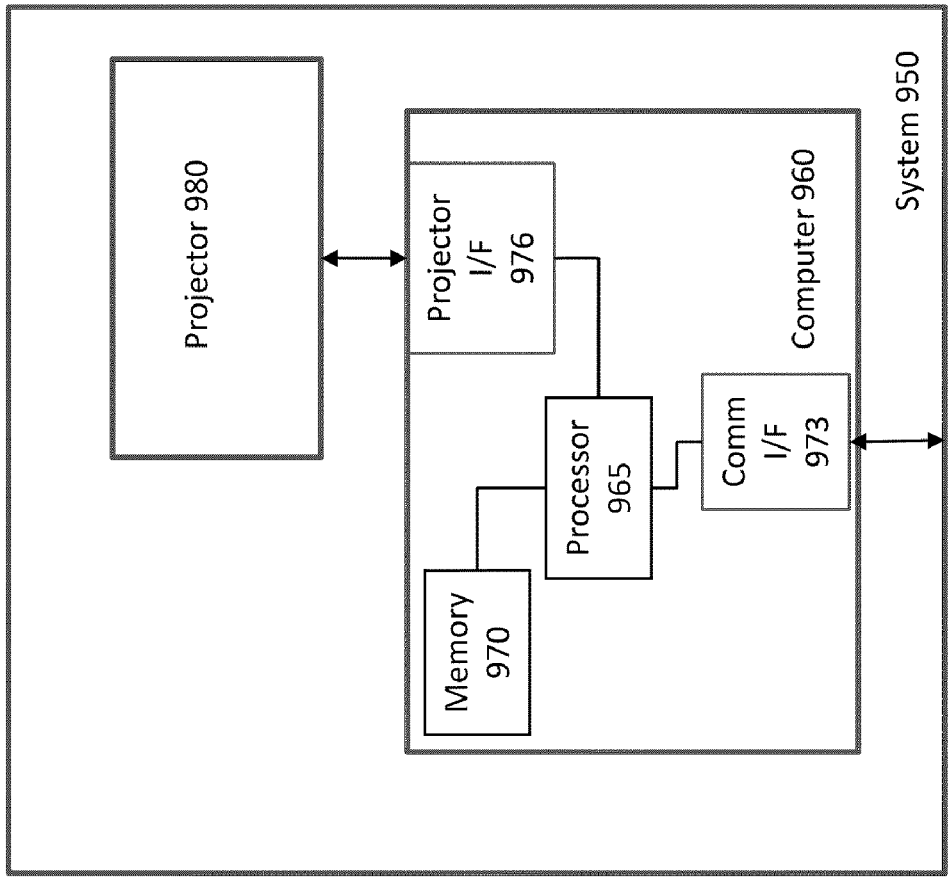
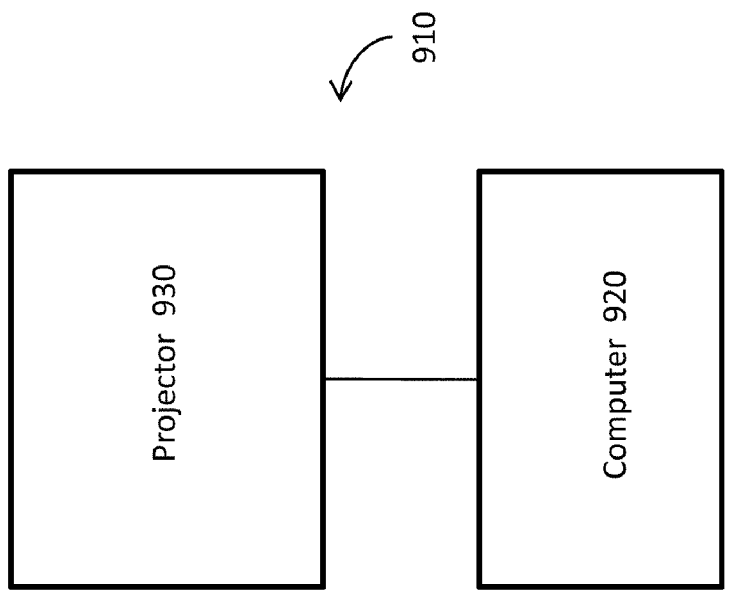

INTEGRATED OPTICAL POLARIZATION COMBINING PRISM FOR PROJECTION DISPLAYS

BACKGROUND

Projection of motion pictures in theatres is still primarily done based on film and projection technology little changed since the dawn of motion pictures. However, compared to film, digital media allows for much easier storage of representations of an image. In order to move beyond film-based projection, it would be useful to provide a digital projector which fits general theater requirements.

Furthermore, a consortium of studios has set forth a standard for future digital projection systems. While this standard is by no means final, it provides a rough guide as to what a system must do—what specifications must be met. Thus, it may be useful to provide a digital projection system which meets the standards of the studio consortium.

BRIEF DESCRIPTION OF THE DRAWINGS

The present invention is illustrated by way of example in the accompanying drawings. The drawings should be understood as illustrative rather than limiting.

FIGS. 4A, 4B and 4C illustrate an embodiment of a complex polarizing beamsplitter which may be used with the embodiments of FIGS. 2 and 3, for example.

FIG. 8 illustrates an embodiment of a computer which may be used with the projectors of FIGS. 1, 2 and 3, for example.

FIG. 9 illustrates an embodiment of a system using a computer and a projector.

DETAILED DESCRIPTION

A system, method and apparatus is provided for an integrated optical polarization combining prism for projection displays. The specific embodiments described in this document represent exemplary instances of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Full color projection displays of dynamic digital images can be achieved by optically merging the output images from multiple electrically driven image generator chips. These chips often achieve the image modulation by optical polarization switching on a pixel by pixel basis. For efficient use of all the input light from a standard white light source, such as a projection lamp, this requires six separate image generation chips be used to provide full spectrum color displays by projecting the spectral components, (e.g. red, green, and blue (RGB), or magenta cyan and yellow), of each image in both optical polarizations. An embodiment of such an optical system is shown in block diagram form in FIG. 1. Generally the image generation chips and their associated optical elements and electronic drive circuits constitute the most expensive components of the system, and both cost and complexity can be reduced if the number of image chips can be reduced. Not only may this reduce initial costs of manufacturing, but ongoing maintenance costs may similarly be reduced through use of fewer such components.

Figure 1:
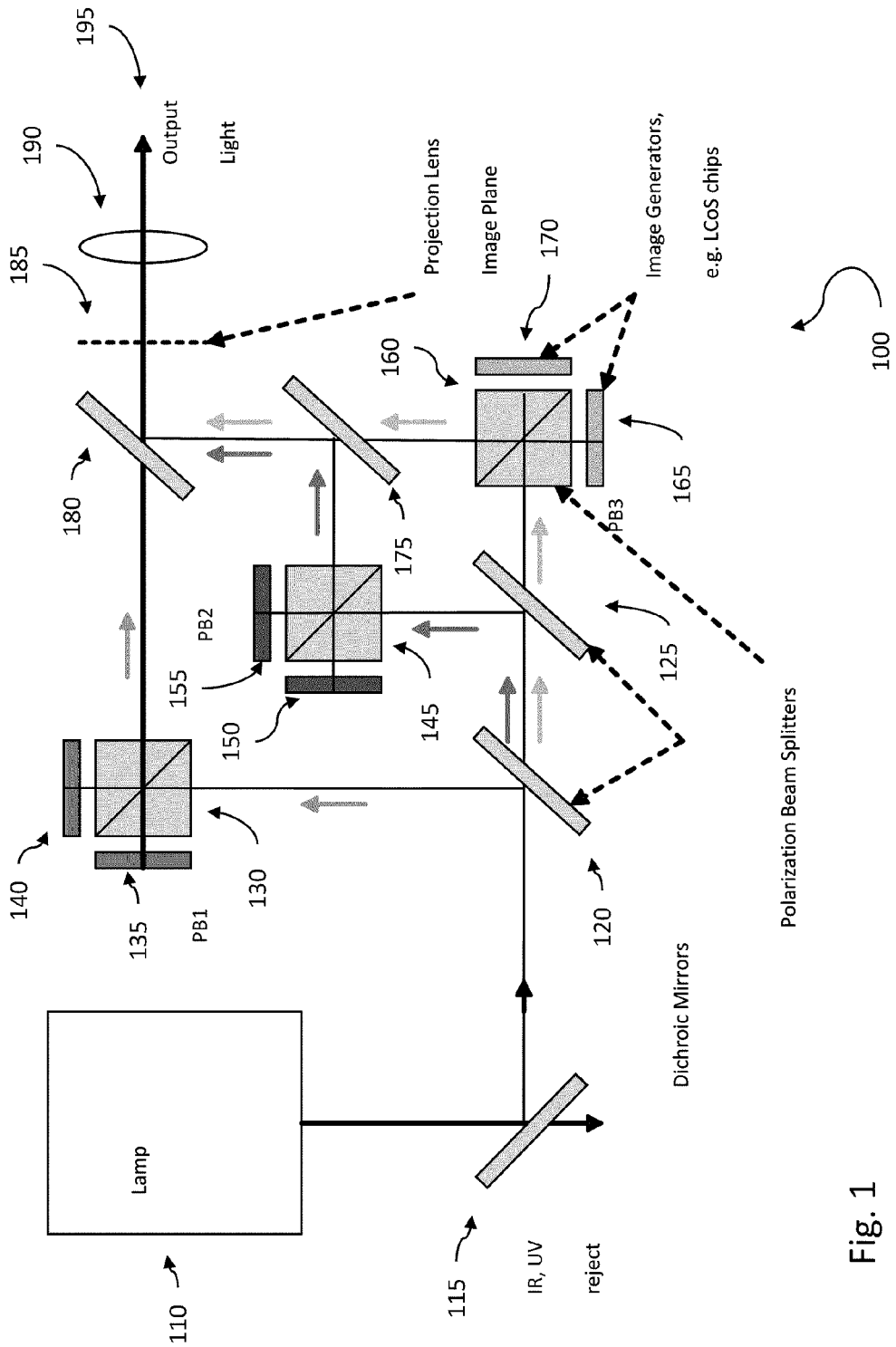
FIG. 1 illustrates an embodiment of an LCoS image projector.

A high efficiency optical design for three color RGB (red, green, blue) image projectors is shown in FIG. 1 that uses six LCoS image planes to obtain both optical polarizations in all colors and is suitable for slide or dynamic video presentations to large screens. A randomly polarized white light source (110) is stripped of IR and UV components by an IR/UV rejection filter (115) input to a first dichroic mirror (120) which reflects the blue portion of the spectrum to a polarizing beam splitter (PB1-130). The remainder of the spectrum passes through the dichroic mirror (120) to a second dichroic mirror (125), which reflects the red portion of the spectrum to a second polarizing beam splitter (PB2-145). The remaining spectrum passes to a third polarizing beam splitter (PB3-160).

Each of the three beam splitters separates its portion of the spectrum into two orthogonal polarization components, each of which is directed to an active LCoS (Liquid Crystal on Silicon) image generation plane (chips 135, 140, 150, 155, 165 and 170). Both polarization components are selectively polarization rotated on a pixel by pixel basis by an electrical signal applied to the LCoS display chips, so as to modulate the input light and impart an image onto the throughput light. Polarization modulated light is reflected from each LCoS chip back through the polarizing beam splitters (130, 145 and 160), so that both polarizations exit from the polarizing beam splitter and are re-combined with similarly processed light of the other spectral portions via dichroic mirrors (175 and 180) to form a white image. The white image (formed at projection lens image plane 185) is focused on a remote screen using a projection lens (190) to provide output light 195.

Application of a voltage to an LCoS chip pixel that is insufficient for 90 degree rotation of the optical polarization results in a smaller rotation of the plane of polarization for a beam reflected from an LCoS chip. On passing back (of the beam) through the polarizing beam splitter the rotated beam is split into two orthogonal polarized components of different intensities that exit the beam splitter in different directions. Thus the intensity of the output beam is reduced in proportion to the degree of polarization rotation (i.e. voltage on the pixel), and the unrotated portion is returned along its entrance path back toward the source.

Although many optical projection systems have been designed, including multicolor displays using reflective LCoS image generation chips, one design the inventor is aware of is not well suited to large high brightness displays. The LCoS image generation devices employ a liquid crystal layer sandwiched between a transparent optical surface and a silicon electronic chip which applies a voltage to the liquid crystal layer on a pixel by pixel basis, causing spatially localized polarization rotation of light and thereby enabling an image to be imparted to light input through the transparent surface and reflecting back from the chip surface. The LCoS devices are universally employed in a reflective mode where the reflected light contains the image information.

The above referenced design (not shown) uses four beam splitting cubes and several color absorption filters. It suffers from a low light efficiency as the input light is first split into two polarizations, each of which is then passed through color filters. This implementation causes half of the polarized light to be absorbed in the color filters. The absorbed light significantly heats the filters, trapping the heat between the polarizing cubes. Consequently this design, although compact, is only compatible with low intensity light, perhaps small fractions of a watt. A large screen multi-media display must be capable of transmitting several hundred watts of light, with potentially tens of watts absorbed in the image generating chips.

In contrast the proposed optical design implementation first separates the input light on a spectral basis, blue, red, then green light, using color separating dichroic mirrors, and each color is then input to its own polarizing beam splitter which directs polarized light to two LCoS image planes, one for each light polarization state. The light is thus spread over six separate LCoS chips. The reflected output images from the three beam splitters each contain both optical polarizations for their respective color, and the colored images are then re-combined using dichroic mirrors. As a result, no light is absorbed in color filters and the system is capable of much higher optical power throughput as the dichroic mirrors absorb comparatively little light, and each color path is very efficient with minimal light loss at the LCoS planes. The LCoS image chips are accessible from the rear (the non-image side) and active chip cooling may therefore be employed to maintain each chip within a preferable operating temperature range.

One option for reducing the number of imaging chips and associated components is to utilize a polarization combining optical prism assembly so that both polarizations in each portion of the spectrum can be applied to a single image generator chip. This can be achieved if the output light from the projection lamp is first split into the required spectral components, e.g. RGB, and each spectral component is then split into its two orthogonal polarizations, one of which is then rotated through ninety degrees by a wave plate before recombining with the other. In this manner the entire optical output of a lamp can be mapped into one polarization and the number of image chips and associated components reduced by half, requiring only one per color.

Figure 2:
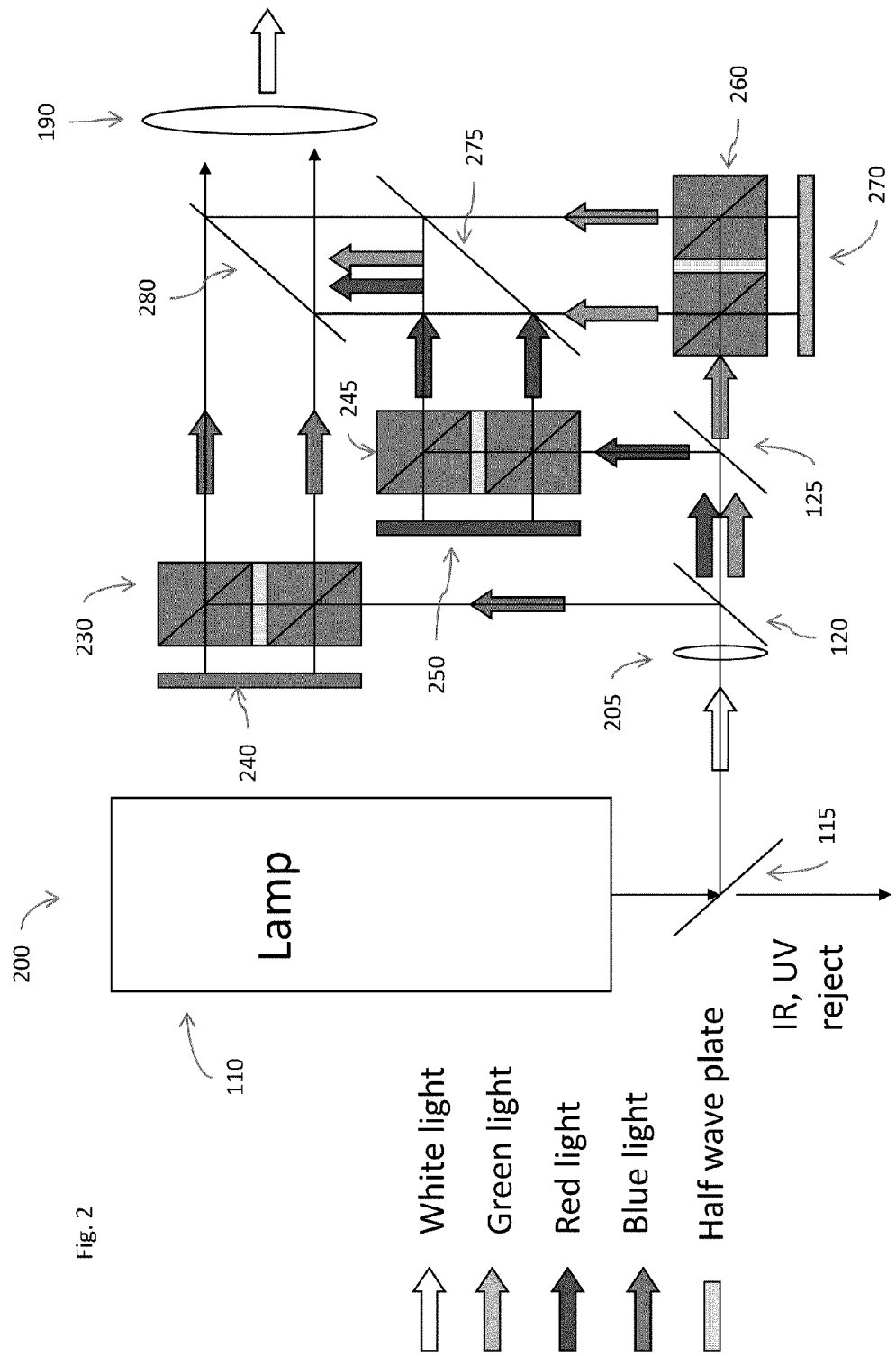
FIG. 2 illustrates another embodiment of an LCoS image projector.

The laws of physics prevent the simultaneous mapping of one polarization onto another of the same color without changing either the angle of the optical beam or its position. As the angle of the beam is usually constrained by the acceptance angle of the projection lens the most feasible approach is to use the two polarization components, each now of the same orientation, to illuminate separate halves of a single image generator chip. FIG. 2 shows an optical system configuration in which an input optical beam is separated into three spectral components with each passing to a prism where the colored beam is split into two polarizations which illuminate different halves of each image chip as described above.

Referring more specifically to FIG. 2, system 200 bears some similarities to system 100 of FIG. 1, while including variations on some components. For example, focusing optics 205 focus incoming light prior to splitting off blue light at dichroic mirror 120. Each of polarizing beamsplitters 230, 245 and 260 split incoming light into two polarizations, rotate one polarization to align with the other, and allow both resulting light beams to be modulated by associated LCoS chips 240, 250 and 270. Resulting output light is recombined at dichroic mirrors 275 and 280, resulting in an output beam at output optics 190 which combines modulated red, green and blue light—an RGB display.

Referring more specifically to polarization beamsplitters 230, 245 and 260, each is an optical assembly made up of two prisms and a half-wave plate. Taking as an example assembly 230, light enters a first prism and is split into a first polarization state that is reflected toward an LCoS chip 240 and a second polarization state orthogonal to the first polarization state Light in the second polarization state is transmitted through the intervening half-wave plate and into a second prism. Note that the half-wave plate is chosen based on the expected color spectrum for the associated prism, and is designed to rotate a second polarization state to the orthogonal first polarization state. In the second prism, the light, now in the first polarization state, is reflected toward the LCoS chip 240. The LCoS chip 240 modulates light based on whether a given pixel should be reflective or non-reflective (light or dark).

Light reflected from the LCoS chip 240 into both prisms is then either transmitted through or reflected back along the input optical path, depending on its polarization state. Light that is associated with "light" pixels is in a polarization state to transmit through the assembly 230 and eventually reach output optics 190. Light that is associated with "dark" pixels is in a polarization state that is reflected back through the prisms toward dichroic mirror 120.

Figure 3:
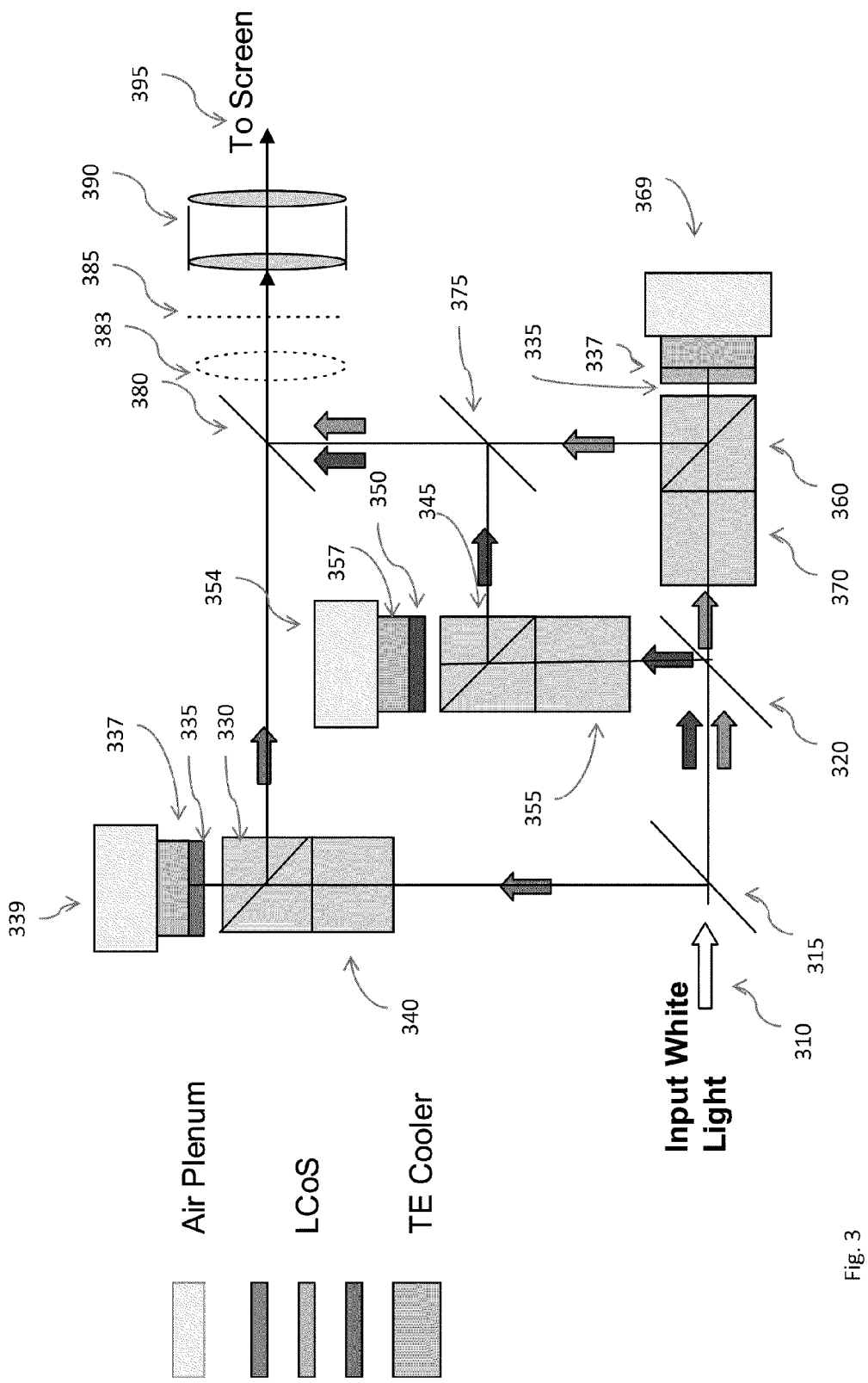
FIG. 3 illustrates yet another embodiment of an LCoS image projector.

The orientation of the optical prism assembly shown in FIG. 2 can be rotated from the vertical configuration shown in the figure to a horizontal configuration producing a more compact optical package as shown in FIG. 3. The two halves of each colored beam are separated horizontally instead of vertically as in FIG. 2. Similarly the optical path can be configured vertically to allow use of the double cubes as in FIG. 1, but where the cubes are in a vertical array above each other. The design of FIG. 3 may provide more guidance in this area.

In an embodiment using polarization combining optics to reduce the number of LCoS image chips to three as shown in FIG. 3, one may provide a projection system with fewer LCoS chips. Thus, FIG. 3 provides an illustration of another embodiment of an LCoS image projector. A randomly polarized white light source (310) is stripped of IR and UV components by an IR/UV rejection filter (315) input to a first dichroic mirror (315) which reflects the blue portion of the spectrum to a prism 340 that converts the entire beam to the same polarization by means of a half-wave plate and passes it to a polarizing beam splitter (330). The remainder of the spectrum passes through the dichroic mirror (315) to a second dichroic mirror (320), which reflects the red portion of the spectrum to a second polarization combining prism 355 and polarizing beam splitter (345). The remaining spectrum passes to a third polarization combining prism 370 and polarizing beam splitter (360).

Each of the three beam splitters separates its portion of the spectrum into two orthogonal polarization components, one of which is directed to an active LCoS (Liquid Crystal on Silicon) image generation plane (chips 335, 350 and 365). Both polarization components are selectively polarization rotated on a pixel by pixel basis by an electrical signal applied to the LCoS display chips, so as to modulate the input light and impart an image onto the throughput light. Polarization modulated light is reflected from each LCoS chip back through the polarizing beam splitters (330, 345 and 360), so that both polarizations exit from the polarizing beam splitter and are re-combined with similarly processed light of the other spectral portions via dichroic mirrors (375 and 380) to form a white image (at projection lens image plane 385) which is focused on a remote screen using a projection optics (390) to provide output light 395. Focusing to plane 385 may involve additional optics 383. Furthermore, each of LCoS chips 335, 350 and 365 are provided with a TEC (thermoelectric coolers 337, 352 and 367 respectively) and associated air plenum (339, 354 and 368 respectively) to provide cooling.

The optical designs in FIGS. 1, 2 and 3 lend themselves to fabrication in a plane so multiple projectors are easily mounted side by side in close proximity. In such embodiments, cooling air flow to each LCoS is perpendicular to the plane of the optics, e.g. into the page, and need not pass through the optical path.

An embodiment of a prism configuration showing how the two polarizations are combined into a single beam of the same polarization covering both halves of the image generator, e.g. an LCoS chip, is shown in FIG. 4. The LCoS image chip is sufficiently far from the polarization integrating prism that the light output from the prism in the boundary between the two halves has a soft transition.

Figure 4C:
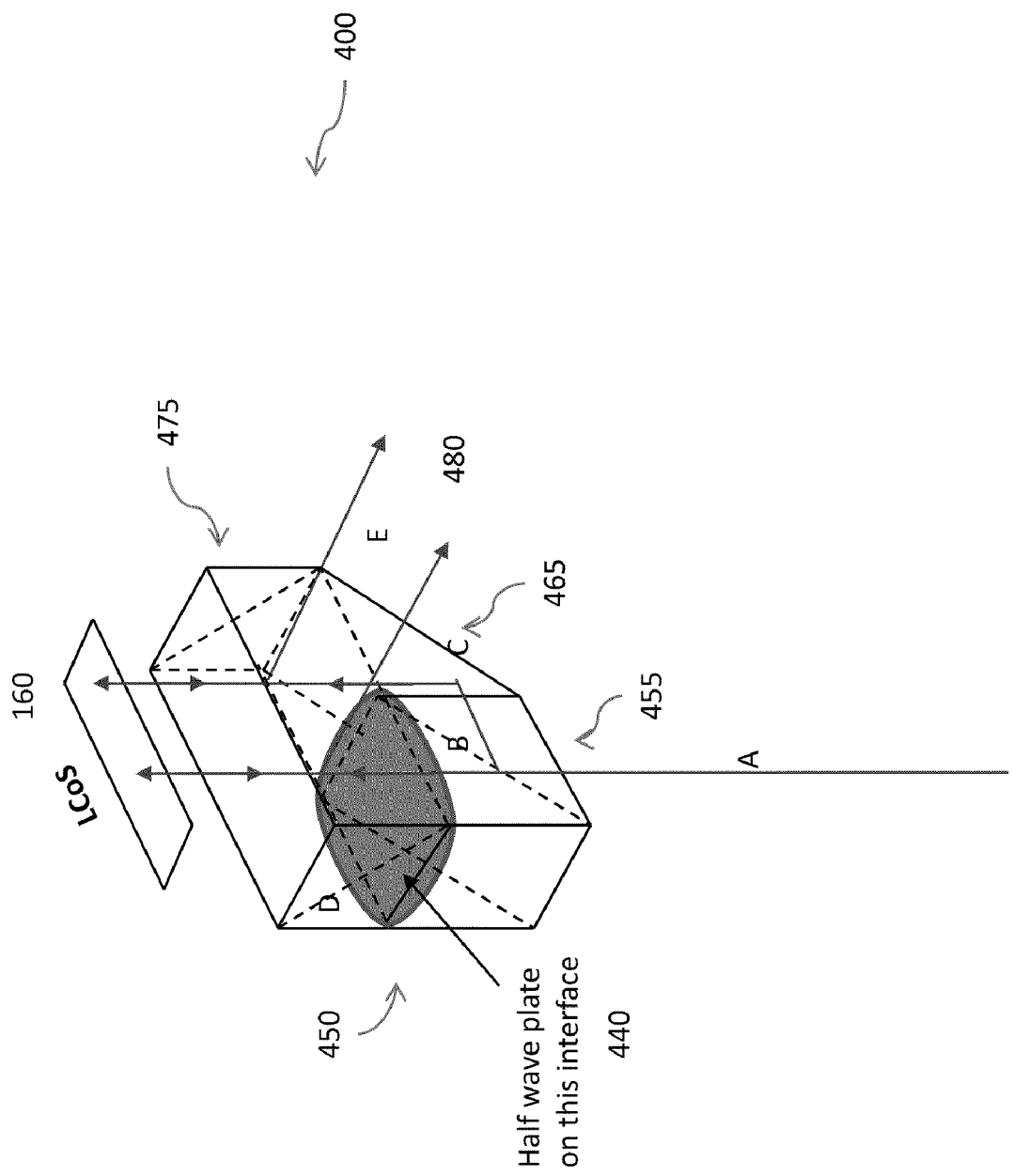

FIGS. 4A, 4B and 4C illustrate an embodiment of a complex polarizing beamsplitter which may be used with the embodiment of FIG. 3, for example. Various display systems using various light sources can be configured using a single image generation chip (LCoS) with maximum light efficiency if both polarizations from the light sources can be directed to the same image chip. This can be accomplished by means of a polarization combining prism which separates an input beam into two polarizations, and rotates one to be oriented similarly to the other. The two halves of the input beam illuminate the two halves of an image generating chip (or other reflective optical component) as shown in FIG. 4A (and 4C). A single polarization beam splitter would suffice if half the light from the light source were not used, but this allows for greater efficiency.

Using a light source similar to that of FIG. 1, for example, one can interpose a more complex polarization beam splitter between the light source and an LCoS chip 160 in display system 400, resulting in creation of two output beams with the same polarization. Beam splitter 450 splits a beam into two beams with the same polarization state. By including a half-wave plate 440 at an interface within the beam splitter 450, one of the beams (the beam passing through the half-wave plate) is polarization rotated to the same state as the other (the beam passing through the mirror and around the half-wave plate) so each beam illuminates a different half of the LCoS chip with the same polarization. Note that the half-wave plate 440 extends only through half of the interface with prism 475—thus it only interacts with one of the beams and has no effect on the other beam. The result is two beams directed at the LCoS chip 160 with the same polarization. The resulting output beams 480 are then directed at a screen, potentially through further projection optics. Note that LCoS chip 160 may need to have twice the width of the LCoS chips 160 of FIG. 1, to accommodate the two beams from beam splitter 450. Alternatively, a lower resolution image can be produced using half of one LCoS chip 160 for each beam.

FIG. 4B further illustrates the complex polarization beam splitter 450. Prism 455 receives light from a light source, and splits it into two light beams having orthogonal polarization states. Mirror 465 reflects one beam with a first polarization state upward (in this perspective). Half wave plate 440 rotates the polarization state of the other beam from a second polarization state to the first polarization state. As a result, two beams are transmitted through prism 475 to a reflective optical component, such as LCoS 160, with each having the same polarization state. Note that whether the first or second polarization state is chosen is not material. The reflective component then reflects light back (potentially modulated for an image) through prism 475, which reflects the light from the reflective optical component 160 as output light 480.

One may further understand the operation of beamsplitter 450 with reference to the lettered portions of FIG. 4C. A beam entering at A passes into a prism (455), the S polarization reflects at B, and the P polarization continues through prism 455. After 90 degrees polarization rotation by half wave plate 440, the beam passes through prism 475 to LCoS 160. Light reflected at B reflects up at C (mirror 465) through prism 475 to LCoS 160. Upward directed beams reflecting down from LCoS 160 (modulated light), are polarization rotated by 90 degrees, and reflect from D (in prism 475), passing out of prism along paths E (providing output light 480).

Figure 4D:
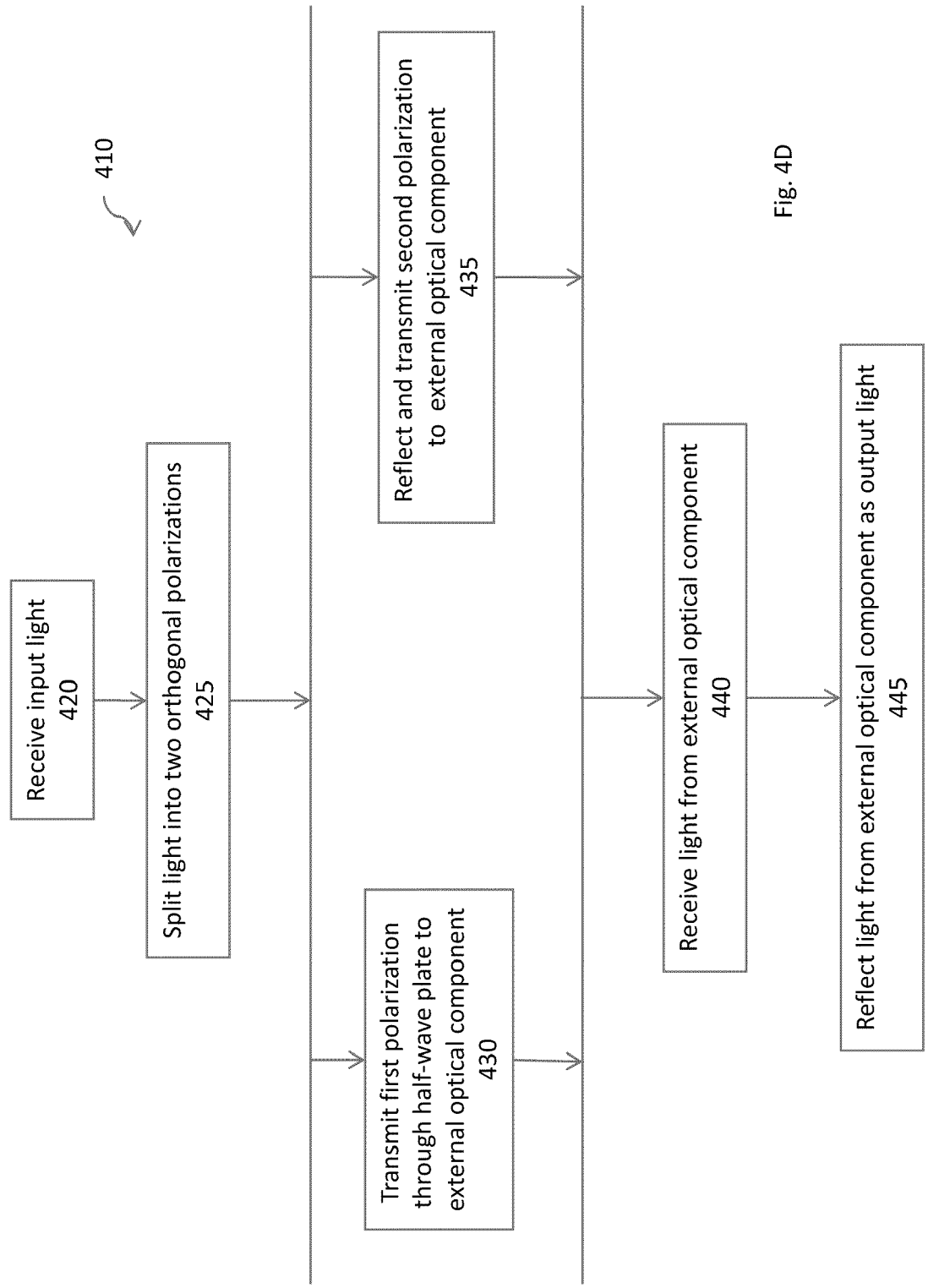
FIG. 4D illustrates an embodiment of a process of optically processing light through a polarizing beamsplitter such as the embodiment of FIGS. 4A-4C.

The process by which the polarization beamsplitter of FIGS. 4A-4C operates may also be useful to understanding. Process 410 of FIG. 4D provides further illustration of operation of the polarization beamsplitter of FIGS. 4A-4C. Process 410 and other processes of this document are implemented as a set of modules, which may be process modules or operations, software modules with associated functions or effects, hardware modules designed to fulfill the process operations, or some combination of the various types of modules, for example. The modules of process 500 and other processes described herein may be rearranged, such as in a parallel or serial fashion, and may be reordered, combined, or subdivided in various embodiments.

Process 410 begins with receipt of input light at module 420. The input light is then split into two orthogonal polarizations at module 425, such as through use of a prism. At module 430, light of the first polarization is transmitted through a half-wave plate (transforming it to light of the second polarization) up to an external optical component. At module 435, light of the second polarization (from the input light) is reflected and transmitted up to the external optical component (or to a second external optical component). Modules 430 and 435 may be expected to operate in parallel or simultaneously in some embodiments. At module 440, the light transmitted to the external optical component is received back, as transformed by the external optical component. At module 445, the light from the external optical component is reflected as output light. Thus, a beam of input light of unknown polarization may be received, transformed into a known polarization, modulated, and provided as output light.

Using the polarization beamsplitter of FIGS. 4A-4C, one may use all available light (or nearly all) in a projector such as system 300 of FIG. 3. As in any system, design optimization for one characteristic reduces another aspect of the design. Combining the two polarizations as described above to reduce the number of image generator chips results in the output projected image having only one polarization. This is not typically a limitation, but it is not possible to project a three dimensional representation of the displayed image by providing separate polarized images to each eye of the viewer with only one polarization state available. This limitation can be overcome if the frame rate of the projected images is doubled and every other set of image frames is polarization rotated before projection. For a typical 24 frame per second large screen projector this requires the frame rate to be increased from 24 to 48 frames per second or greater.

A number of different techniques can be employed to rotate the output polarization of a projected beam. For example, a rotating prism assembly may be employed, but such post image mechanical devices require extreme precision alignment to avoid image degradation due to jitter. To optimally (or near-optimally) utilize the full output of a projection lamp it may be more useful to use an electronically activated polarization switch so that the output beam is in one of two polarizations for most of the time, i.e. the time to switch between polarization states is short compared to the 'on' time for each polarization.

Any such polarization switch should enable a high level of optical throughput power, so any heat sensitive polarization switch would be limited for high brightness, large screen displays. Potential options include a transmission liquid crystal or PLZT ceramic polarization switch. Although easily fabricated and electrically driven the large aperture required (typically 5 centimeters, 2 inches), will generate thermal gradients across the aperture, and if one switch is used for the combined colors a wavelength optimization issue potentially exists as the blue wavelength at 450 nm is significantly far from that of red at 680 nm. Alternatively, a LC switch located in and optimized for each wavelength section of the optics may be employed. If fabricated on thermally conducting material such as sapphire the lower heat flux and a well designed thermal path may enable a viable solution requiring only a low dc voltage. A liquid cooled switch would also potentially eliminate this problem but would require a circulation pump and be prone to leakage and other thermally induced issues. One option to alleviate such issues is to use a reflective liquid crystal switch where temperature control is maintained via the back plate, and which can also act as an electrode, however the optical insertion of such a switch into the optical path is potentially problematic.

Figure 5:
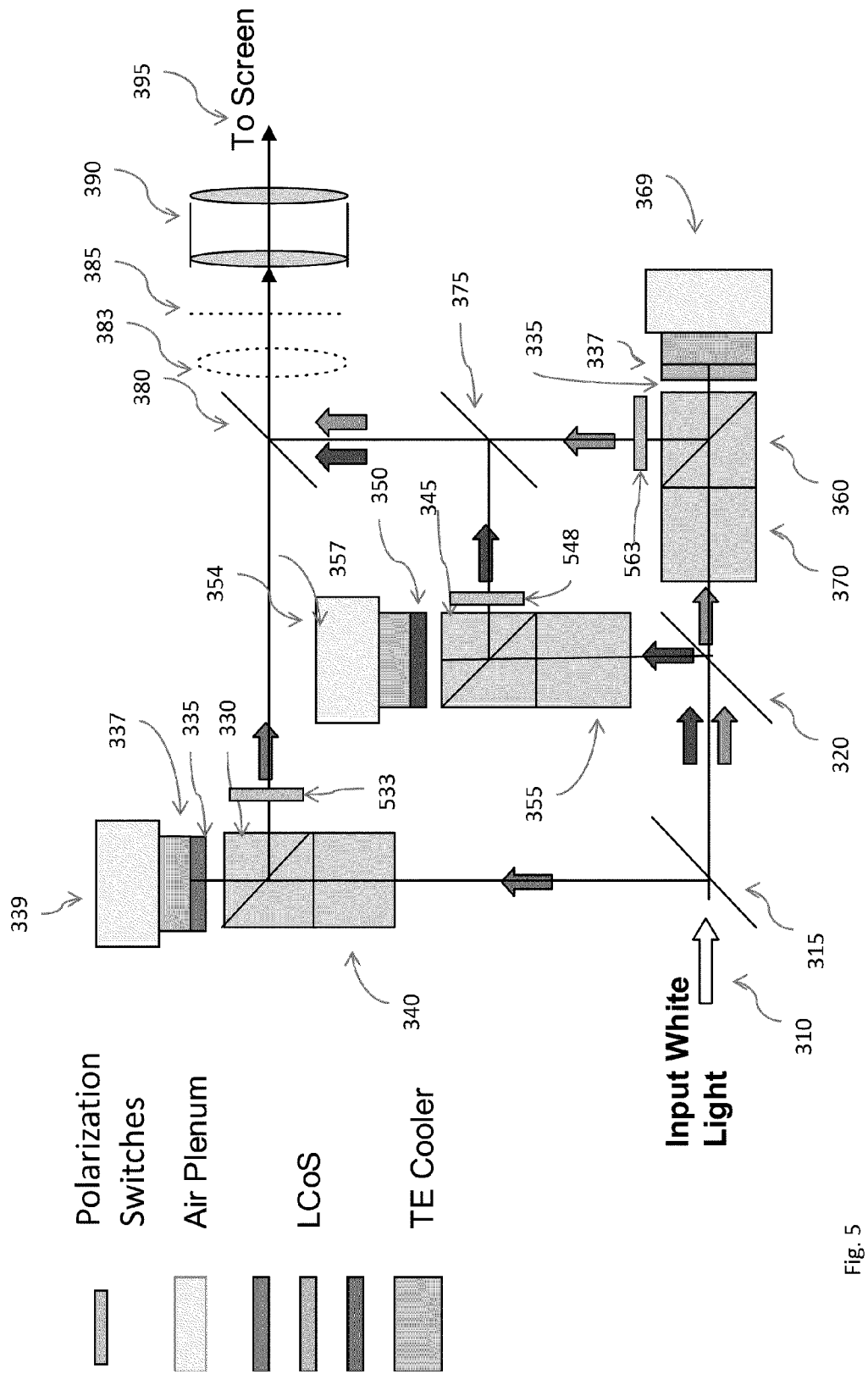
FIG. 5 illustrates an alternative embodiment of an LCoS image projector based on the embodiment of FIG. 3.

Use of such a switch in a system may be understood with reference to FIG. 5. A set of polarization switching liquid crystal devices, each optimized for its associated wavelength, could be located in each color path immediately after the integrated prism assembly as shown in FIG. 5. Thus, polarization switch 533 is located at the output of beamsplitter 330, polarization switch 548 is located at the output of beamsplitter 345, and polarization switch 563 is located at the output of beamsplitter 360.

Each LC optical polarization switch, in some embodiments, is a thin sandwich of LC material between two sapphire plates, coated on the inside with transparent conductive coating, and separated by a non-conducting spacer. The plates may be heat sunk around their periphery (not shown). Simulated 3D imagery is obtained if the polarization of sequential color sets of images are rotated to permit discrimination by the viewer. This can be achieved with either orthogonal linear polarizations or with opposed circular polarizations, the latter mitigating against image cross-talk when a viewer rotates his head from a vertical alignment. One may also expect that all elements of the optics are anti-reflection coated on their operating surfaces in the various embodiments for the appropriate wavelength as per standard practice.

Figure 6:
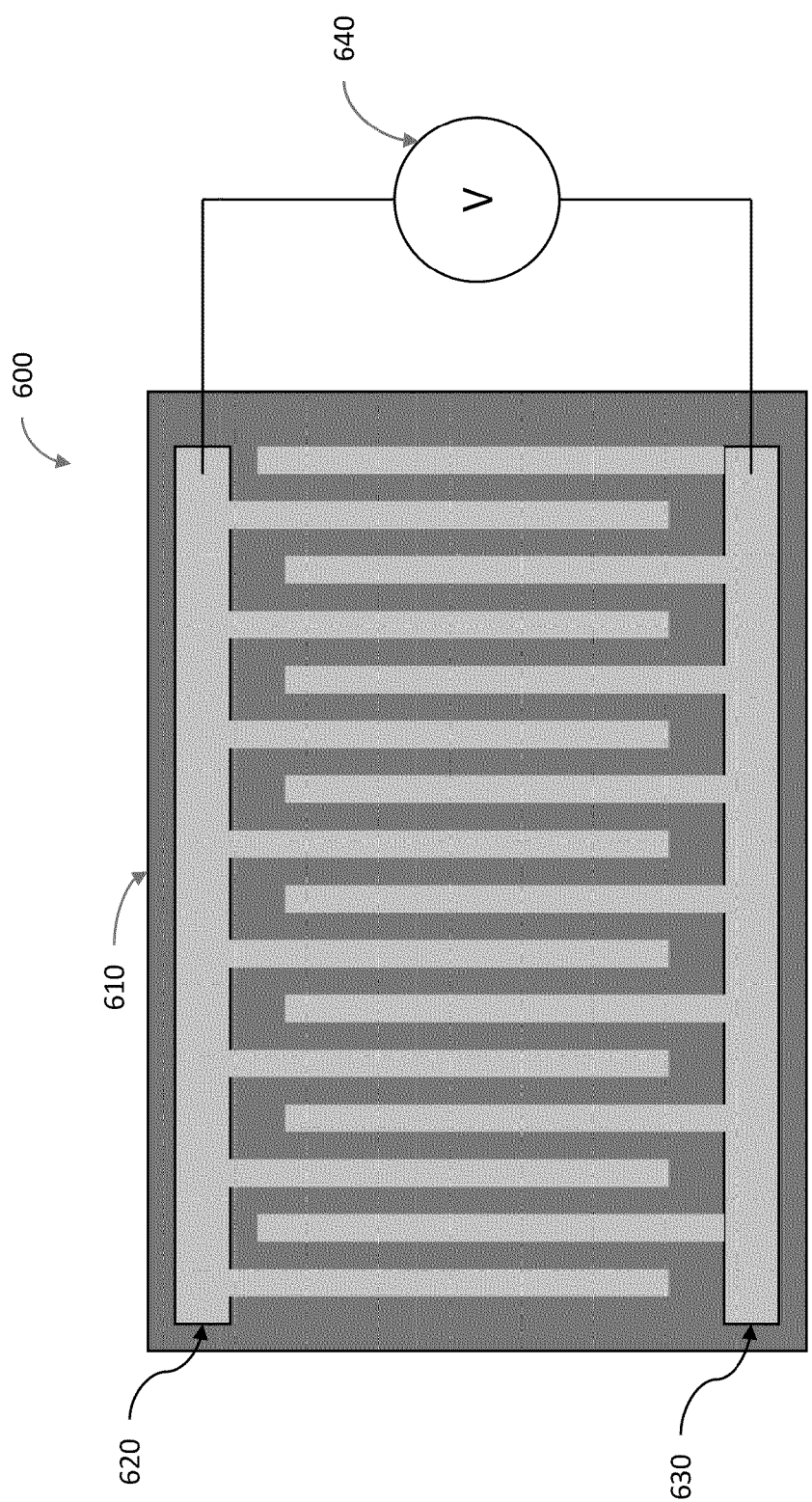
FIG. 6 illustrates an embodiment of a PLZT ceramic filter.

As mentioned, generally it is desirable to minimize the number of moving parts in any system. One option for doing this in a projector is to use an electrically programmable filter that can withstand the high optical energy flux near the lamp source. While the liquid crystal switch described above is one option, this can also be achieved by a filter made from PLZT ceramic, an electro-optic material that effectively rotates the plane of polarization of an optical beam to a degree set by an applied voltage. The PLZT ceramic wafer is coated with inter-digitated electrodes as shown in FIG. 6. The PLZT can have similar electrode patterns on both sides as the polarizing field propagates only a small distance into the material. A typical electrode material is a transparent layer of Tin Oxide, and the electrodes on the two sides are offset to provide relatively uniform transmission. Typical drive voltages are a few hundred volts and the response is limited by the device capacitance and is often about one millisecond.

With further reference to FIG. 6, one may further understand the structure and function of the PLZT. PLZT wafer system 600 is illustrated with PLZT wafer 610 having two electrodes 620 and 630, and an external voltage source 640. The electrodes 620 and 630 may constitute first and second electrodes, and each may be placed on opposite sides (first and second sides) of wafer 610. With a reasonable thickness of wafer 610, the electric field between electrodes 620 and 630 will sufficiently penetrate wafer 610 to change its transmission characteristics. For a material such as tin oxide, the interdigitated electrodes shown will generally suffice to provide a change in transmission characteristics throughout the wafer 610. The typical effect is a polarization rotation which in conjunction with a linear polarizer produces the effect of a filter with electrically controllable transmission. Edge effects can be avoided by over-sizing the wafer somewhat relative to the optical path for projection. Note that a similar structure can be used for the liquid crystal switch described above—one having skill in the art will understand the differences between the two structures.

Figure 7:
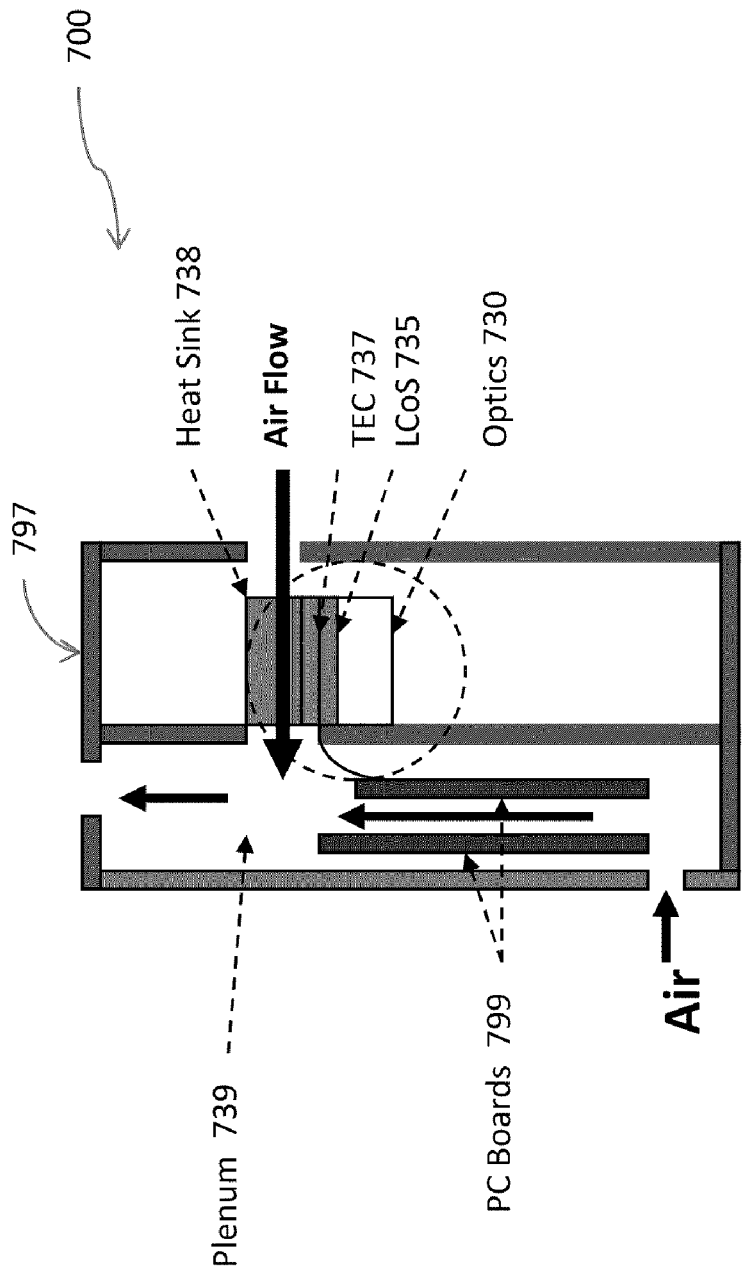
FIG. 7 illustrates cooling in embodiments such as those of FIGS. 1, 2, 3 and 5, for example.

Keeping all of this equipment cooled enough to maintain desired optical transmission properties can also be a challenge. For a theater, where hundreds of watts of output may be desired, much heat will be generated, and even small inefficiencies of a few percent result in much heat that needs to be dissipated. Projector 700 of FIG. 7 provides a simplified representation of a housing 797 which may be used to house and cool such a system.

Housing 797 includes two cavities (more may be included), one in which optical components are mounted or coupled to the housing and another cavity in which other components such as electronic components and/or printed circuit boards are housed. Thus, PC boards 799 may be mounted to or coupled to housing 797 in a second cavity. Optics 730 (such as beamsplitters, dichroic mirrors, lenses, etc.), LCoS chips 735 and TEC 737 may all be mounted in the first cavity as illustrated. Additionally, an associated heat sink may be placed directly in the illustrated air flow, coupled to mounted directly to TEC 737. Moreover, air flow through the second cavity generally may be provided, both for overall cooling and for cooling of the PC boards 799 or any other associated components. Plenum 739 allows for flow of air to an outlet, and potentially for recirculation. One advantage of this design is that the cooling air flow as shown is kept away from the optics—thereby reducing potential artifacts due to temperature differentials in the optical path.

The projector in various embodiments may be used with a computer and generally used as part of a larger system. FIG. 8 illustrates an embodiment of a computer which may be used with the projectors of FIGS. 1 and 5, for example. The following description of FIG. 8 is intended to provide an overview of computer hardware and other operating components suitable for performing the methods of the invention described above and hereafter, but is not intended to limit the applicable environments. Similarly, the computer hardware and other operating components may be suitable as part of the apparatuses and systems of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 8 shows one example of a conventional computer system that can be used as a client computer system or a server computer system or as a web server system. The computer system 800 interfaces to external systems through the modem or network interface 820. It will be appreciated that the modem or network interface 820 can be considered to be part of the computer system 800. This interface 820 can be an analog modem, isdn modem, cable modem, token ring interface, satellite transmission interface (e.g. "direct PC"), or other interfaces for coupling a computer system to other computer systems. In the case of a closed network, a hard-wired physical network may be preferred for added security.

The computer system 800 includes a processor 810, which can be a conventional microprocessor such as microprocessors available from Intel or Motorola. Memory 840 is coupled to the processor 810 by a bus 870. Memory 840 can be dynamic random access memory (dram) and can also include static ram (sram). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). Display controller 830 can, in some embodiments, also control a projector such as those illustrated in FIGS. 1 and 5, for example. The input/output devices 855 can include a keyboard, disk drives, printers, a scanner, and other input and output devices, including a mouse or other pointing device. The input/output devices may also include a projector such as those in FIGS. 1 and 5, which may be addressed as an output device, rather than as a display. The display controller 830 and the I/O controller 860 can be implemented with conventional well known technology. A digital image input device 865 can be a digital camera which is coupled to an i/o controller 860 in order to allow images from the digital camera to be input into the computer system 800. Digital image data may be provided from other sources, such as portable media (e.g. FLASH drives or DVD media).

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows(r) from Microsoft Corporation of Redmond, Wash., and their associated file management systems. Another example of an operating system software with its associated file management system software is the Linux operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus.

Various general purpose systems may be used with programs in accordance with the teachings herein, or it may prove convenient to construct more specialized apparatus to perform the required method steps. The required structure for a variety of these systems will appear from the description. In addition, the present invention is not described with reference to any particular programming language, and various embodiments may thus be implemented using a variety of programming languages.

FIG. 9A illustrates an embodiment of a system using a computer and a projector. System 910 includes a conventional computer 920 coupled to a digital projector 930. Thus, computer 920 can control projector 930, providing essentially instantaneous image data from memory in computer 920 to projector 930. Projector 930 can use the provided image data to determine which pixels of included LCoS display chips are used to project an image. Additionally, computer 920 may monitor conditions of projector 930, and may initiate active control to shut down an overheating component or to initiate startup commands for projector 930.

FIG. 9B illustrates another embodiment of a system using a computer and projector. System 950 includes computer subsystem 960 and optical subsystem 980 as an integrated system. Computer 960 is essentially a conventional computer with a processor 965, memory 970, an external communications interface 973 and a projector communications interface 976.

The external communications interface 973 may use a proprietary (a standard developed for such a device but not publicized by its developer), or a publicly available communications standard, and may be used to receive both digital image data and commands from a user. The projector communications interface 976 provides for communication with projector subsystem 980, allowing for control of LCoS chips (not shown) included in projector subsystem 980, for example. Thus, projector communications interface 976 may be implemented with cables coupled to LCoS chips, or with other communications technology (e.g. wires or traces on a printed circuit board) coupled to included LCoS chips. Other components of computer subsystem 960, such as dedicated user input and output modules, may be included, depending on the needs for functionality of a conventional computer system in system 950. System 950 may be used as an integrated, standalone system—thus allowing for the possibility that each theater may use its own projector with a built-in control system, for example.

Various implementations of different embodiments may ultimately be provided. In an embodiment, an optical component is provided. The optical component includes a first polarizing prism having a first face, a second face and a third face. The light beam may be received incident on the first face. Light having a first polarization may be output through a second face and light having a second polarization may be output through a third face. The optical component further includes a half-wave plate fastened to the second face of the first polarizing prism. The optical component further includes a first reflecting prism connected to the third face of the first polarizing prism. The first reflecting prism has a first face and a second face, the first face connected to the third face of the first polarizing prism. The optical component further includes a second reflecting prism connected to the half-wave plate and to the second face of the first reflecting prism. The second reflecting prism has a first face, a second face and a third face. The first face of the second reflecting prism connected to the half-wave plate and the second face of the first reflecting prism. The optical component may be used in a projector, among other potential applications in some embodiments.

In some embodiments, the half-wave plate is designed for light in the blue portion of the visible spectrum. Similarly, in some embodiments, the half-wave plate is designed for light in the green portion of the visible spectrum. Likewise, in some embodiments, the half-wave plate is designed for light in the red portion of the visible spectrum. Moreover, in other embodiments, the half-wave plate may be designed for light in other parts of the visible spectrum—such as light used in a cyan-magenta-yellow-based display, for example.

The optical component may further include an external optical component coupled to the second face of the second reflecting prism to receive light output from the second reflecting prism and to reflect light back to the second reflecting prism. In some embodiments, the external optical component is an LCoS chip. In other embodiments, the optical component may further include a first external optical component coupled to the second face of the second reflecting prism to receive light output from the second reflecting prism and to reflect light back to the second reflecting prism and a second external optical component coupled to the third face of the second reflecting prism.

In another embodiment, a system is presented. The system includes a light source and a housing coupled to the light source. The system also includes first, second and third LCoS assemblies coupled to the housing. Each LCoS assembly includes a first polarizing prism having a first face, a second face and a third face. The light beam may be received incident on the first face. Light having a first polarization may be output through a second face and light having a second polarization may be output through a third face. The optical component further includes a half-wave plate fastened to the second face of the first polarizing prism. The optical component further includes a first reflecting prism connected to the third face of the first polarizing prism. The first reflecting prism has a first face and a second face, the first face connected to the third face of the first polarizing prism. The optical component further includes a second reflecting prism connected to the half-wave plate and to the second face of the first reflecting prism. The second reflecting prism has a first face, a second face and a third face. The first face of the second reflecting prism connected to the half-wave plate and the second face of the first reflecting prism.

The system further includes a first beam splitter and a second beam splitter both coupled to the housing. The first beam splitter is arranged to split incoming light from the beam combining element between the first LCoS assembly and the second beam splitter. The second beam splitter is arranged to split incoming light between the second LCoS assembly and the third LCoS assembly.

The system further includes a first beam recombiner and a second beam recombiner both coupled to the housing. The beam recombiners may be dichroic mirrors, for example. The first beam recombiner is arranged to receive light from the first LCoS assembly and the second LCoS assembly. The second beam recombiner is arranged to receive light from the first beam recombiner and from the third LCoS assembly. The system also includes an output optics element coupled to the housing and arranged to receive light from the second beam recombiner and to focus an output light source.

The system may further include the half-wave plate of the first LCoS assembly being designed for light in the blue portion of the spectrum of visible light; the half-wave plate of the second LCoS assembly being designed for light in the red portion of the spectrum of visible light; and the half-wave plate of the third LCoS assembly being designed for light in the green portion of the spectrum of visible light. Moreover, the system may involve a first polarization switch coupled to the first LCoS assembly, a second polarization switch coupled to the first LCoS assembly and a third polarization switch coupled to the first LCoS assembly. In some embodiments, the first polarization switch, the second polarization switch and the third polarization switch each are liquid crystal switches. In other embodiments, the first polarization switch, the second polarization switch and the third polarization switch each are PLZT switches. In some embodiments, each of the first LCoS assembly, second LCoS assembly and the third LCoS assembly include a thermoelectric cooler coupled to the LCoS chip of each LCoS assembly. Moreover, in some embodiments, each of the first LCoS assembly, second LCoS assembly and the third LCoS assembly include a heat sink coupled to the thermoelectric cooler of each LCoS assembly.

In some embodiments, the system further includes a processor and a memory coupled to the processor. Moreover, the system may include a bus coupled to the memory and the processor. Additionally, the system may include a communications path between the processor and each of the first and second LCoS chips of the first, second and third LCoS assemblies. In some embodiments, the housing includes an air plenum separate from an optical path defined by the beam splitters, LCoS assemblies and beam recombiners.

In yet another embodiment, a method is provided. The method includes receiving input light in a polarization splitting prism. The method further includes splitting the input light into a first polarization and a second polarization orthogonal to the first polarization. The method also includes transmitting the first polarization through a half-wave plate to a first external optical component. The method further includes transmitting the second polarization to a second external optical component. The method also includes receiving light from the first and second external optical components. Moreover, the method includes reflecting light from the first and second external optical components as output light. In some embodiments, the first optical component and the second optical component are portions of a single unitary optical component. In some embodiments, the first optical component and the second optical component are portions of an LCoS chip.

One skilled in the art will appreciate that although specific examples and embodiments of the system and methods have been described for purposes of illustration, various modifications can be made without deviating from present invention. For example, embodiments of the present invention may be applied to many different types of databases, systems and application programs. Moreover, features of one embodiment may be incorporated into other embodiments, even where those features are not described together in a single embodiment within the present document.

The invention claimed is:

1. An optical component, comprising:
a first polarizing prism having a first face, a second face and a third face, wherein a light beam may be received incident on the first face, light having a first polarization may be output through a second face and light having a second polarization may be output through a third face;
a half-wave plate fastened to the second face of the first polarizing prism;
a first reflecting prism connected to the third face of the first polarizing prism, the first reflecting prism having a first face and a second face, the first face connected to the third face of the first polarizing prism; and
a second reflecting prism connected to the half-wave plate and to the second face of the first reflecting prism, the second reflecting prism having a first face, a second face and a third face, the first face of the second reflecting prism connected to the half-wave plate and the second face of the first reflecting prism.

2. The optical component of claim 1, wherein:
the half-wave plate is designed for light in the blue portion of the visible spectrum.

3. The optical component of claim 1, wherein:
the half-wave plate is designed for light in the green portion of the visible spectrum.

4. The optical component of claim 1, wherein:
the half-wave plate is designed for light in the red portion of the visible spectrum.

5. The optical component of claim 1, further comprising:
an external optical component coupled to the second face of the second reflecting prism to receive light output from the second reflecting prism and to reflect light back to the second reflecting prism.

6. The system of claim 5, wherein:
the external optical component is an LCoS chip.

7. The optical component of claim 1, further comprising:
a first external optical component coupled to the second face of the second reflecting prism to receive light output from the second reflecting prism and to reflect light back to the second reflecting prism; and
a second external optical component coupled to the third face of the second reflecting prism.

8. The system of claim 1, wherein:
the half-wave plate of the first LCoS assembly is designed for light in the blue portion of the spectrum of visible light, the half-wave plate of the second LCoS assembly is designed for light in the red portion of the spectrum of visible light, the half-wave plate of the third LCoS assembly is designed for light in the green portion of the spectrum of visible light.

9. The system of claim 8, further comprising:
a first polarization switch coupled to the first LCoS assembly;
a second polarization switch coupled to the first LCoS assembly; and
a third polarization switch coupled to the first LCoS assembly.

10. The system of claim 9, wherein:
the first polarization switch, the second polarization switch and the third polarization switch each are liquid crystal switches.

11. The system of claim 10, wherein:
the first polarization switch, the second polarization switch and the third polarization switch each are PLZT switches.

12. The system of claim 9, wherein:
the first beam splitter and the second beam splitter are each dichroic mirrors.

13. The system of claim 8, wherein:
each of the first LCoS assembly, second LCoS assembly and the third LCoS assembly include a thermoelectric cooler coupled to the LCoS chip of each LCoS assembly.

14. The system of claim 13, wherein:
each of the first LCoS assembly, second LCoS assembly and the third LCoS assembly include a heat sink coupled to the thermoelectric cooler of each LCoS assembly.

15. The system of claim 14, further comprising:
a processor;
a memory coupled to the processor;
a bus coupled to the memory and the processor; and
a communications path between the processor and each of the first and second LCoS chips of the first, second and third LCoS assemblies.

16. The system of claim 15, wherein:
the housing includes an air plenum separate from an optical path defined by the beam splitters, LCoS assemblies and beam recombiners.

17. A system, comprising:
a light source;
a housing coupled to the light source;
a first LCoS assembly coupled to the housing, the first LCoS assembly including:
a first polarizing prism having a first face, a second face and a third face, wherein a light beam may be received incident on the first face, light having a first polarization may be output through a second face and light having a second polarization may be output through a third face;
a half-wave plate fastened to the second face of the first polarizing prism;
a first reflecting prism connected to the third face of the first polarizing prism, the first reflecting prism having a first face and a second face, the first face connected to the third face of the first polarizing prism;
a second reflecting prism connected to the half-wave plate and to the second face of the first reflecting prism, the second reflecting prism having a first face, a second face and a third face, the first face of the second reflecting prism connected to the half-wave plate and the second face of the first reflecting prism; and
an LCoS chip coupled to the second face of the second reflecting prism;
a second LCoS assembly coupled to the housing, the second LCoS assembly including:
a first polarizing prism having a first face, a second face and a third face, wherein a light beam may be received incident on the first face, light having a first polarization may be output through a second face and light having a second polarization may be output through a third face;
a half-wave plate fastened to the second face of the first polarizing prism;
a first reflecting prism connected to the third face of the first polarizing prism, the first reflecting prism having a first face and a second face, the first face connected to the third face of the first polarizing prism;
a second reflecting prism connected to the half-wave plate and to the second face of the first reflecting prism, the second reflecting prism having a first face, a second face and a third face, the first face of the second reflecting prism connected to the half-wave plate and the second face of the first reflecting prism; and
an LCoS chip coupled to the second face of the second reflecting prism;
a third LCoS assembly coupled to the housing, the third LCoS assembly including:
a first polarizing prism having a first face, a second face and a third face, wherein a light beam may be received incident on the first face, light having a first polarization may be output through a second face and light having a second polarization may be output through a third face;
a half-wave plate fastened to the second face of the first polarizing prism;
a first reflecting prism connected to the third face of the first polarizing prism, the first reflecting prism having a first face and a second face, the first face connected to the third face of the first polarizing prism;
a second reflecting prism connected to the half-wave plate and to the second face of the first reflecting prism, the second reflecting prism having a first face, a second face and a third face, the first face of the second reflecting prism connected to the half-wave plate and the second face of the first reflecting prism; and
an LCoS chip coupled to the second face of the second reflecting prism;
a first beam splitter and a second beam splitter both coupled to the housing, the first beam splitter arranged to split incoming light from the beam combining element between the first LCoS assembly and the second beam splitter, the second beam splitter arranged to split incoming light between the second LCoS assembly and the third LCoS assembly;
a first beam recombiner and a second beam recombiner both coupled to the housing, the first beam recombiner arranged to receive light from the first LCoS assembly and the second LCoS assembly, the second beam recombiner arranged to receive light from the first beam recombiner and from the third LCoS assembly; and
an output optics element coupled to the housing and arranged to receive light from the second beam recombiner and to focus an output light source.

* * * * *